United States Patent
Schulz et al.

(10) Patent No.: US 8,158,916 B2
(45) Date of Patent: Apr. 17, 2012

(54) COLOR CONTROLLED LIGHT SOURCE AND A METHOD FOR CONTROLLING COLOR GENERATION IN A LIGHT SOURCE

(75) Inventors: Volkmar Schulz, Wuerselen (DE); Bernd Ackermann, Aachen (DE); Lorenzo Feri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 326 days.

(21) Appl. No.: 12/446,475

(22) PCT Filed: Oct. 23, 2007

(86) PCT No.: PCT/IB2007/054306
§ 371 (c)(1),
(2), (4) Date: Apr. 21, 2009

(87) PCT Pub. No.: WO2008/050294
PCT Pub. Date: May 2, 2008

(65) Prior Publication Data
US 2010/0315007 A1   Dec. 16, 2010

(30) Foreign Application Priority Data
Oct. 27, 2006  (EP) .................. 06123064

(51) Int. Cl.
*G01J 1/20* (2006.01)
*H01J 40/14* (2006.01)
(52) U.S. Cl. .................. 250/201.1; 250/226
(58) Field of Classification Search ........... 250/201.1, 250/205, 226; 315/149–159
See application file for complete search history.

(56) References Cited

U.S. PATENT DOCUMENTS

| 6,236,331 | B1 | 5/2001 | Dussureault | |
|---|---|---|---|---|
| 6,542,270 | B2 | 4/2003 | Perkins et al. | |
| 6,683,590 | B1 | 1/2004 | Pang et al. | |
| 2001/0007505 | A1* | 7/2001 | Lee et al. | 358/500 |
| 2002/0071161 | A1* | 6/2002 | Perkins et al. | 359/154 |
| 2004/0030229 | A1* | 2/2004 | Norris | 600/323 |
| 2005/0019040 | A1 | 1/2005 | Trutna | |
| 2005/0259439 | A1* | 11/2005 | Cull et al. | 362/612 |

FOREIGN PATENT DOCUMENTS

| EP | 1067824 A2 | 1/2001 |
|---|---|---|
| EP | 1635617 A2 | 3/2006 |
| JP | 11331086 A | 11/1999 |
| WO | 2005096258 A1 | 10/2005 |
| WO | 2006111934 A1 | 10/2006 |

* cited by examiner

*Primary Examiner* — Georgia Y Epps
*Assistant Examiner* — Renee Naphas
(74) *Attorney, Agent, or Firm* — Mark L. Beloborodov

(57) ABSTRACT

This invention relates to a color controlled light source comprising a plurality of colored light elements; a detector for detecting the light output of the light source and generating a detection signal; and a color control unit for generating driving signals to said light elements on the basis of said detection signal and a predetermined target color point of the light output of the light source. In order to enable detection of contributions from individual light elements to the light output of the light source, the light source further comprises a modulator for individual signature modulation of the driving signal to each one of said light elements; and a corresponding demodulator for demodulation of said detection signal and generation of actual, i.e. measured, values of the output of the individual light elements. The color control unit determines nominal values of the light output of each light element for obtaining said target color point, and compares the actual values with the nominal values. If there is a difference, it adjusts the driving signals in order to minimize the difference.

10 Claims, 3 Drawing Sheets

COLOR CONTROLLED LIGHT SOURCE AND A METHOD FOR CONTROLLING COLOR GENERATION IN A LIGHT SOURCE

FIELD OF THE INVENTION

The present invention relates to Solid State Lighting, and more particularly relates to a color controlled light source according to the preamble of claim 1, and to a method for controlling color generation in a light source according to the preamble of claim 5.

BACKGROUND OF THE INVENTION

In order to realize a light source for multiple colors, e.g. different color temperatures, in Solid State Lighting, LEDs emitting light of different colors, are used in one device. These LEDs define a sub area in the color space indicating the color gamut that can be realized via all possible linear combinations. Colored light of desired intensity within the color spectrum of the color space can hence be controlled by means of the signal input of the individual LEDs. It should be noted that white light is included in the term colored light.

Unlike traditional light sources colored LEDs will "color shift" due to the changes of the junction temperature, the current, aging effects and binning of the LEDs. As the light output starts to wane from the pre-defined color point due to temperature and aging, the target color point of the light output of the light source will become distorted. Consequently, the color point of the light source has to be stabilized via a control loop.

For the purpose of monitoring the light output from a light source it is quite common to use RGB-sensors or true-color-sensors having the same sensitivity as the standard observer or approximating these curves. Alternatively, one or more flux sensors are used, possibly in combination with one or more temperature sensors.

However, when the light detector detects the light output from a light source it may be interfered by other light sources, for instance ambient sunlight and/or other color-LEDs. As a result the measured color intensity is often defective and does not solely represent the light output from the LEDs in the light source itself. Consequently the feedback signal to the control device of the control loop is incorrect.

SUMMARY OF THE INVENTION

It is an object of the present invention to provide a light source and a method for controlling color generation in a light source that alleviates the above-mentioned interference problems in the color control.

This object is achieved by a color controlled light source according to the present invention as defined in claim 1. The appended sub-claims define preferred embodiments of the invention.

Thus, in accordance with an aspect of the present invention, there is provided a color controlled light source comprising a plurality of colored light elements, a detector for detecting the light output of the light source and generating a detection signal, and a color control unit for generating driving signals to said light elements on the basis of said detection signal and a predetermined target color point of the light output of the light source.

The light source further comprises a modulator for individual signature modulation of the driving signal to each one of said light elements, and a demodulator for demodulation of the detection signal and extracting each actual value of the light output of each one of said light elements by identifying each individual signature. Further, the color control unit comprises means for determining nominal values of the light output of each light element to obtain said target color point, and means for comparing said extracted actual values with said nominal values and, if there is a difference, adjusting said driving signals in order to minimize the difference.

The signature modulation of each one of the light elements allows essentially the true/actual contributed light output from an individual light element to be identified and extracted from the total light output. Thus, any ambient light from the sun or other light sources will not distort the measured intensity of a single light element. Hence a more exact representation of the light output of each one of the colored light elements is provided to the color control unit. This in turn is used for adjusting the required driving signal that is fed to each of one of the light elements to correspond to the desired output color point in a precise way.

Thus, the invention provides a robust and continuous determination of each individual color contribution of a light source, which determined contribution is unaffected by interference from other bright light sources. The invention is scalable to any arbitrary amount of primary colors.

The use of individual signature modulation of a light element is known per se from U.S. Pat. No. 6,542,270, to Perkins et al. However, it is only used to enable determination of a position of a light receiver in a building, where the output light of ordinary lamps for lighting up the rooms is individually coded. This is, thus, a different technical field.

In accordance with an embodiment of the color controlled light source as defined in claim 2, the signature modulation as described above is done by CDMA (code division multiple access) modulation with a specific coding scheme for identification and/or extraction of the light output of each one of the light elements. CDMA is a method for transmitting simultaneous signals over a shared portion of the spectrum, while allowing all the signals to have their own specific coding scheme for identification. In addition CDMA coding is of great advantage, since the normal illumination driving function of a LED can be provided simultaneously with the individual signature modulation as is utilized in the present invention.

In accordance with an embodiment of the color controlled light source as defined in claim 3 the specific coding scheme is advantageously based on either On-Off Keying or BiPhase modulation.

In accordance with an embodiment of the color controlled light source as defined in claim 4 the detection is advantageously done by means of one of an RGB sensor, an XYZ sensor, and a flux sensor. The feature of signature modulation brings the advantage that any of these sensor types are suitable for detecting the light output of the light source, since the individual LEDs can be traced and extracted from the output signal of any one of these sensors.

In accordance with another aspect of the present invention, there is provided a method for controlling color generation in a light source comprising a plurality of colored light elements. The method comprises detecting the light output of the light source and generating a detection signal; and generating driving signals to said light elements on basis of said detection signal and a predetermined target color point of the light output of the light source.

The method further comprises individual signature modulating the driving signal to each one of said light elements. The detection of the light output comprises extracting each actual value of the light output of each one of said light elements by demodulating said detection signal and identifying each individual signature. Additionally, the method comprises determining nominal values of the light output of each light element for obtaining said target color point, and comparing said extracted actual values with said nominal values and, if there is a difference, adjusting said driving signals in order to minimize the difference.

The nominal values of the light output of each light element, depends on the characteristics (such as its bin information) of the light elements used. The means to determine these nominal values are, as known to the person skilled in the act, based for example on solving the inverse matrix problem coupling the targeted color point and the bin information light elements.

According to embodiments of the method, the signature modulating as described above is done by CDMA (code division multiple access) modulation; the specific coding scheme can optionally be based on On-Off Keying or BiPhase modulation; and the detection is done by means of one of an RGB sensor, an XYZ sensor, and a flux sensor. The method provides advantages and effects analogous to those achieved by the light source of the invention as described above.

These and other aspects of the invention will be apparent from and elucidated with reference to the embodiments described hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will now be described in more detail and with reference to the appended drawings, in which.

DESCRIPTION OF PREFERRED EMBODIMENTS

Figure 1:
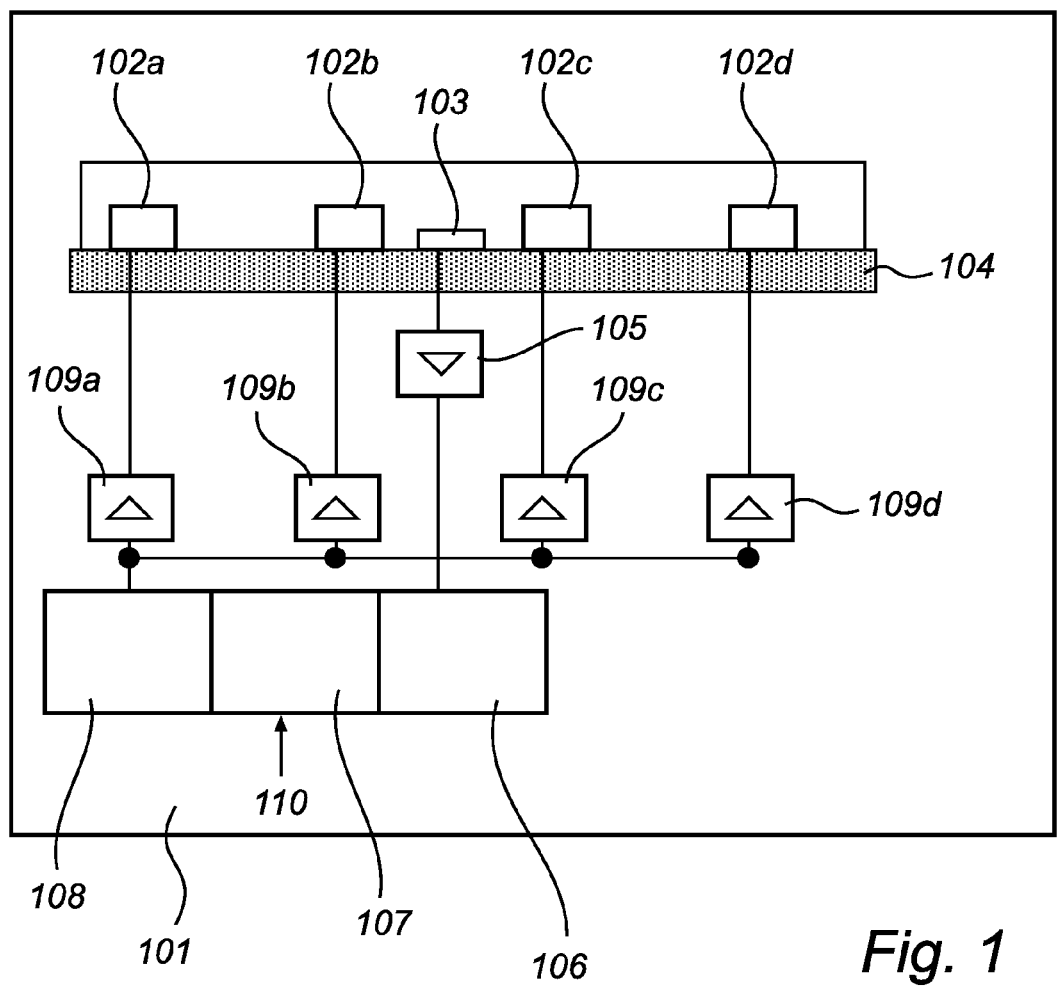
FIG. 1 is a schematic diagram of an embodiment of a light source (SSL LAMP) according to the present invention.

According to a first embodiment of the color controlled light source of this invention, as shown in FIG. 1, the color controlled light source 101 comprises n colored light elements 102a-d, here as an example n=4, a detector 103 for detecting the output light from the light elements 102a-d, an amplifier 105 connected to an output of the detector 103, a demodulator, which is a CDMA demodulator, 106, connected to the detector 103 via the amplifier 105, a color control unit 107, connected to the demodulator 106, a modulator 108, which is a CDMA modulator, connected to the color control unit 107, and light element drivers 109a-d connected to the modulator 108 and to the LEDs 102a-d. The light elements 102a-d are arranged on a substrate 104 and can be any of LEDs, OLEDs and (O)LED-Strings. Below LEDs will be used as a common term. In FIG. 1 the color of the LEDs 102a-d are green, red, blue and amber, but the choice of color is of course optional and depends on the device requirements. Each LED 102a-d is fed via a LED-driver 109a-d. The inputs of the drivers 109a-d are connected to the CDMA modulator 108. The CDMA modulator modulates the driving signal, i.e. the input, of each one of the drivers 109a-d (e.g. voltage) with a train of rectangular pulses. Thereby implementing a signature modulation scheme identifying each of the colored light elements 102a-d. The features of the rectangular pulses are defined according to the required intensity, while the intensity value is received from the color control unit 107. The color control unit 107 is controlling the amount of emitted light per light element 102a-d in order to produce the predetermined target color point 110, which can be given by the user or be pre-programmed into the unit. The intensity adjustment of the light elements, 102a-d, can be done by modulating the amplitudes or the duty-cycles of the pulses, or both. The feedback to the color control unit 107 is a demodulated signal, which is received from the CDMA demodulator 106. The CDMA demodulator 106, in turn, processes a measured flux signal, representing the light output of the light source 101 as detected by the detector 103, and fed as a detection signal to the CDMA demodulator 106. More particularly the CDMA demodulator demodulates the detection signal into the measured flux signal and extracts the contribution from different LEDs 102a-d by correlating said measured flux signal with their individual signatures, according to said signature modulation schemes, and then provides the result as a demodulated signal to the color control unit 107.

The CDMA modulation is exemplified as CDMA modulation using a synchronous system where Walsh-Hadamard codes are utilised. Walsh-Hadamard is an algorithm for generating statistically unique sets of numbers for use in encryption and cellular communications, and is also known as "pseudo-random noise code" often used in direct sequence spread spectrum (DSSS) systems, such as QUALCOMM's CDMA, and in frequency hopping spread spectrum (FHSS) systems for selecting the target frequency for the next hop. The codes generated by the algorithm are "orthogonal" mathematical codes. This means that if two Walsh codes are correlated the result is intelligible only if these two codes are the same. As a result, a Walsh-Hadamard-encoded signal appears to be random noise to a CDMA demodulator, unless that demodulator uses the same signature code as the one used to modulate the incoming signal. By avoidance of the so called DC-code of a Walsh-Hadamard set of codes, i.e. the one code that relates to an average DC signal component, the system is made robust against constant ambient light.

In one embodiment of the color controlled light source 101 the specific coding scheme of the CDMA modulator is based on On-Off Keying. On-Off Keying (OOK) modulation is a type of modulation where digital data is represented as the presence or absence of a carrier wave. In its simplest form the presence of a carrier for a specific duration represents a binary one, and its absence for the same duration represents a binary zero, although in principle any digital encoding scheme may be used.

Figure 2:
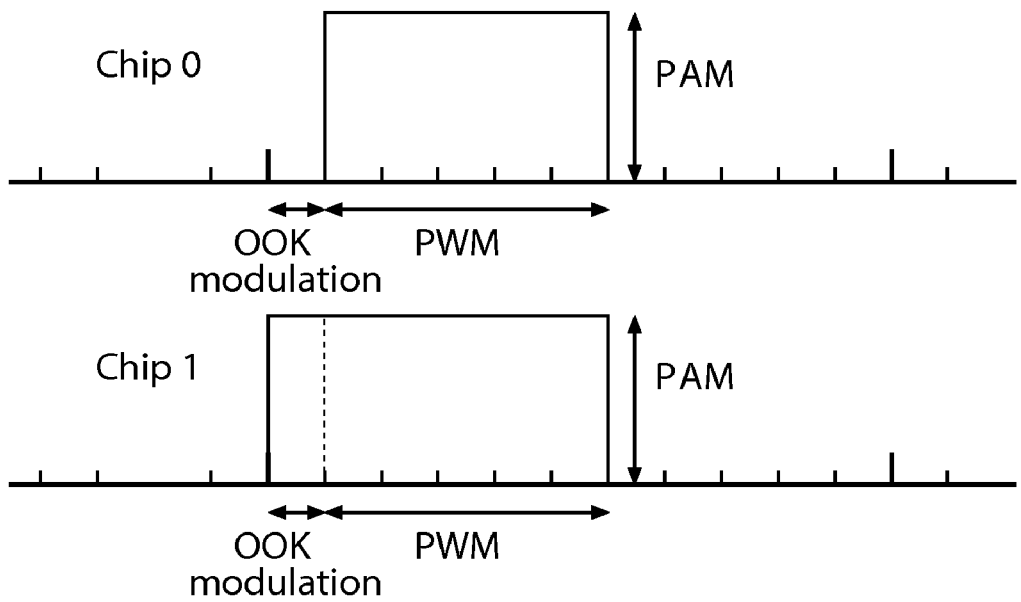
FIG. 2 shows the use of CDMA OnOff-Keying modulation with pulse width modulation (PWM) and pulse amplitude modulation (PAM), according to another embodiment of the light source.

The signature modulation code assigned to each light element is carried in the signal by On-Off Keying modulating the first part of each pulse, which is shown in FIG. 2. Here two examples on the driving signal to the LED in order to guarantee the required illumination is shown: 1. applying pulse width modulation (PWM) to the second part of the pulse, and 2. applying pulse amplitude modulation (PAM) to the pulse. In FIG. 2 "chip 0" and "chip 1" will have different widths. In principle this would lead to a variation in the light output of the LEDs. Nevertheless, this can be repaired by using balanced codes, which means that there is provided the same number of chips 0 and 1. Therefore the width of pulses, averaged over a code word, will be exactly the average value between "chip 0" and "chip 1" widths.

Figure 3:
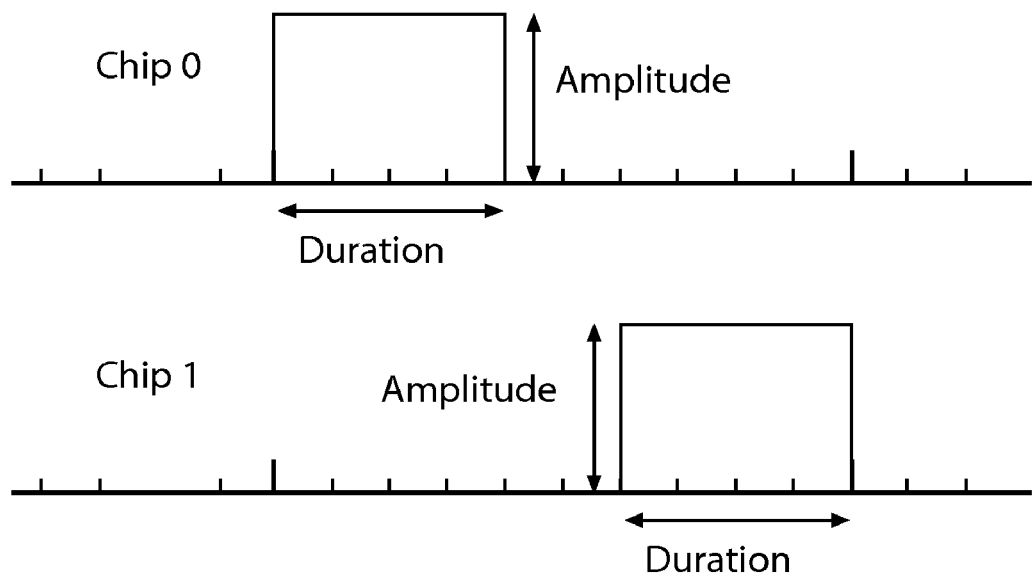
FIG. 3 shows the use of CDMA BiPhase (DC-BP) modulation with Duty Cycle modulation and amplitude modulation, according to a further embodiment of the light source.

In yet another embodiment of the invention, as illustrated in FIG. 3, the modulation method is a generalization of BiPhase (BP) modulation, to allow an arbitrary duty cycle. When the duty cycle equals 50%, Duty Cycle BiPhase (DC-BP) degenerates to BP modulation. In this case, the code embodying the individual signature that each light element is assigned is carried in the signal by transmitting "chip 0" and "chip 1" accordingly. To guarantee the required illumination, i.e. light output level of the LEDs, there are two options: 1. Modify the duty-cycle of the pulses, and 2. Modify the amplitude of the pulses.

As to the light detector 103, as mentioned above it can be of different types, such as an RGB sensor or an XYZ sensor. The RGB-sensor can detect both color information and intensity of the light, but the color information comes from three separate sensor elements, which typically have quite narrow bandwidth. The XYZ sensor is constructed to have the same transfer function as the human eye and thus has a higher level of accuracy than the RGB sensor but will not automatically separate the contributions from the individual LEDs in the measured light.

Figure 4:
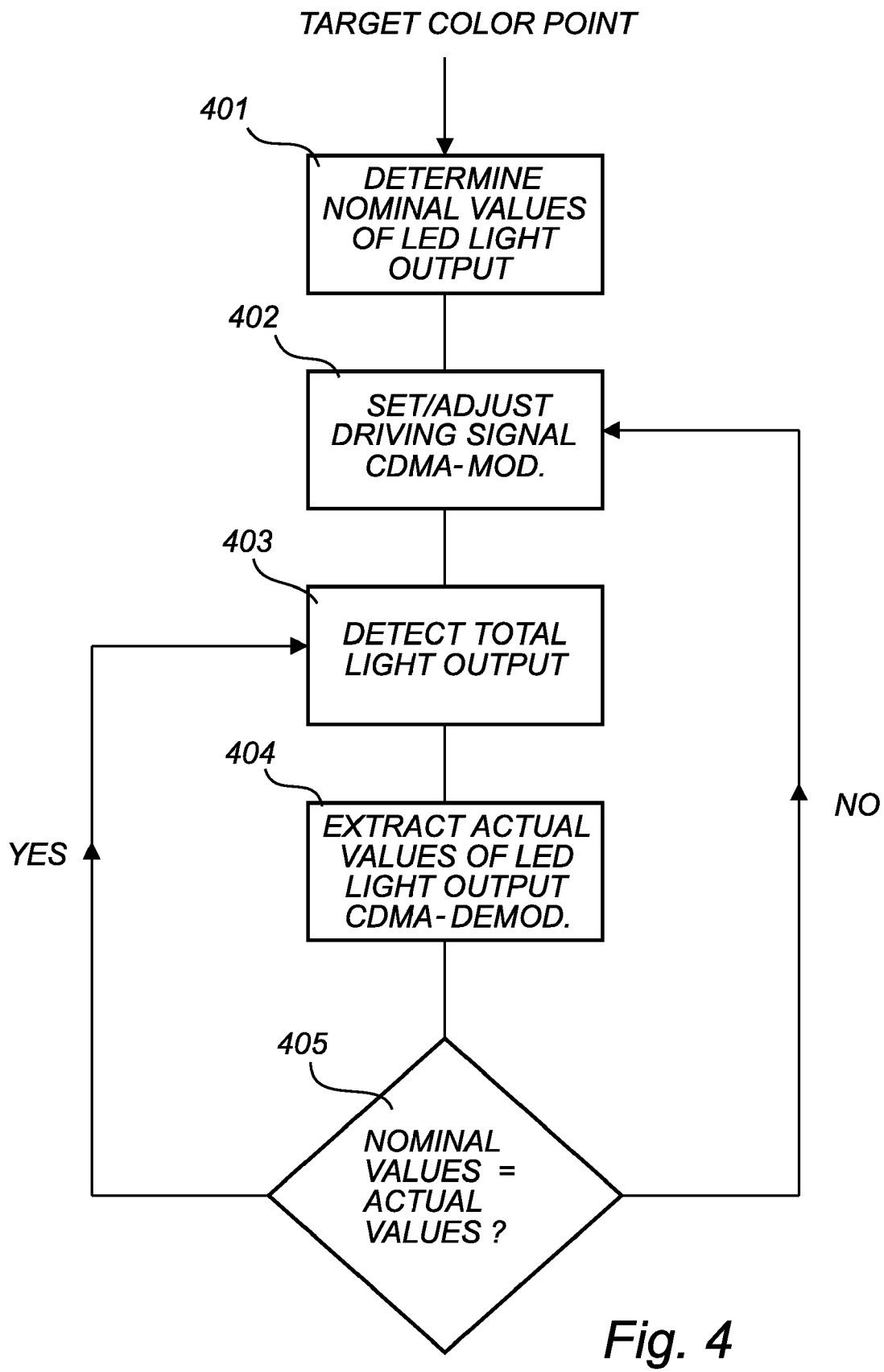
FIG. 4 is a flow chart showing the steps of an embodiment of the method for controlling color generation in a light source, according to the present invention.

Referring to the flow chart of FIG. 4, an embodiment of the method for controlling color generation in a light source according to this invention comprises the following steps:

- determining a nominal value of the light output of each individual LED 102a-d on the basis of a predetermined target color point, box 401;
- setting/adjusting the driving signals to the LED-drivers 109a-d according to the nominal values of the light outputs, and simultaneously applying the CDMA signature modulation designated for each individual LED 102a-d, box 402;
- detecting the light output of the light source 101, and generating a detection signal, box 403;
- CDMA-demodulating the detection signal and extracting the actual value of the light output of each individual LED 102a-d by identifying each individual signature, box 404;
- comparing the nominal value of the light output of each individual LED 102a-d with the actual value of the light output of each individual LED 102a-d, box 405; and
- if the actual values match with the nominal values, return to the detection step in box 403, or
- if one or more of the light output values do not match, return to box 402 for further adjustment of the individual driving signals.

Above, embodiments of the light source and the method according to the present invention have been described. These should be seen as merely non-limiting examples. As understood by a skilled person, many modifications and alternative embodiments are possible within the scope of the invention as defined in the appended claims.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A method for controlling color generation in a light source for emitting light, the light source comprising a plurality of colored light-emitting elements each configured to output a corresponding colored light, the method comprising:

determining nominal values for the colored light output by each of the colored light-emitting elements that result in the light emitted by the light source having a target color point;

detecting the light emitted by the light source and generating therefrom a detection signal;

generating driving signals based on the detection signal and the target color point, and providing the driving signals to the colored light-emitting elements; and individual signature modulating the driving signal for each of the light elements with a corresponding signature;

wherein the detecting step comprises demodulating the detection signal into a measured flux signal, and correlating the measured flux signal with each of the signatures to extract an actual value of the colored light output by each of the colored light-emitting elements; the method further comprising:

comparing the extracted actual values with the nominal values and, if there is a difference, adjusting the driving signals in order to minimize the difference.

2. A method according to claim 1, wherein said individual signature modulating the driving signal to each one of the light elements consists of individually coded CDMA modulation of said driving signals.

3. The method of claim 2, wherein the individually coded CDMA modulation of the driving signals comprises applying orthogonal codes to the driving signals.

4. A method according to claim 1, wherein said individual signature modulation is based on one of On-Off Keying and BiPhase modulation.

5. A method according to claim 1, wherein the light output of the light source is detected by means of one of an RGB sensor, an XYZ sensor, and a flux sensor.

6. A light source for emitting light, comprising:

a plurality of colored light-emitting elements each configured to output a corresponding colored light;

a detector configured to detect the light emitted by the light source and in response thereto to generate a detection signal; and a color control unit configured to determine nominal values for the colored light output of each of the colored light-emitting elements that result in the light emitted by the light source having a target color point, the color control unit further being configured to generate driving signals based on the detection signal and the target color point, and to provide the driving signals to the colored light-emitting elements;

a modulator configured to apply an individual signature modulation with a corresponding signature to each of the driving signals; and a demodulator configured to demodulate the detection signal into a measured flux signal, and to correlate the measured flux signal with each of the signatures to extract an actual value of the colored light output by each of the colored light-emitting elements, wherein the color control unit is configured to compare the extracted actual values with the nominal values and, if there is a difference, to adjust the driving signals in order to minimize the difference.

7. The light source of claim 6, wherein the modulator is a CDMA modulator, which provides individually, coded modulation of said driving signals.

8. The light source of claim 7, wherein the CDMA modulator applies orthogonal codes to the driving signals.

9. The light source of claim 6, wherein said individual signature modulation is based on one of On-Off Keying and BiPhase modulation.

10. The light source of claim 6, wherein said detector is one of an RGB sensor, an XYZ sensor, and a flux sensor.

* * * * *